United States Patent [19]

Isganitis et al.

[11] Patent Number: 5,563,644
[45] Date of Patent: Oct. 8, 1996

[54] INK JET PRINTING PROCESSES WITH MICROWAVE DRYING

[75] Inventors: Louis V. Isganitis, Rochester; Edward J. Radigan, Hamlin; Arthur M. Gooray, Penfield; Leonard M. Carreira, Penfield; William M. Schwarz, all of Webster, N.Y.

[73] Assignee: Xerox Corporation, Stamford, Conn.

[21] Appl. No.: 829,863

[22] Filed: Feb. 3, 1992

[51] Int. Cl.$^6$ ........................................ B41J 2/05
[52] U.S. Cl. ........................ 347/102; 106/20 D; 347/100
[58] Field of Search ............................. 346/1.1, 25, 140; 355/287; 347/102, 100; 106/20 D

[56] References Cited

U.S. PATENT DOCUMENTS

| | | | |
|---|---|---|---|
| 3,673,140 | 6/1972 | Ackerman et al. | 268/22 TN |
| 3,801,329 | 4/1974 | Sander et al. | 96/115 P |
| 4,088,618 | 5/1978 | Saltzman et al. | 260/24 |
| 4,104,143 | 8/1978 | Wasilewski et al. | 204/159 |
| 4,206,937 | 6/1980 | Huston | 282/27.5 |
| 4,243,994 | 1/1981 | Kobayashi | 347/100 X |
| 4,395,287 | 7/1983 | Kobayashi | 106/20 |
| 4,469,026 | 9/1984 | Irwin | 347/102 X |
| 4,482,239 | 11/1984 | Hosono | 355/287 |
| 4,575,729 | 3/1986 | Ayers | 347/102 X |
| 4,839,142 | 6/1989 | Charm | 422/21 |
| 5,116,409 | 5/1992 | Moffatt | 106/22 |

FOREIGN PATENT DOCUMENTS

| | | | |
|---|---|---|---|
| 0509688A1 | 3/1992 | European Pat. Off. | C09D 11/00 |
| 107490 | 8/1980 | Japan | B41J 29/00 |
| 12673 | 2/1981 | Japan | G03G 15/20 |

OTHER PUBLICATIONS

Johnston, D. R. Drying of Ink By Radiation World Surface Coatings Abstracts vol. 44, No. 350, Aug. 71.

Primary Examiner—Joseph W. Hartary
Attorney, Agent, or Firm—Judith L. Byorick

[57] ABSTRACT

Disclosed is a printing process which comprises applying in imagewise fashion to a substrate an ink composition which comprises an aqueous liquid vehicle, a colorant, and a drying component selected from the group consisting of zwitterionic compounds, and subsequently exposing the substrate to microwave radiation, thereby drying the images on the substrate. In a preferred embodiment, the invention is directed to a thermal ink jet printing process which comprises (1) incorporating into a thermal ink jet printing apparatus an ink composition which comprises an aqueous liquid vehicle, a colorant, and a drying component selected from the group consisting of zwitterionic compounds; (2) heating the ink in an imagewise pattern to cause bubbles to form therein, thereby causing droplets of the ink to be ejected in an imagewise pattern onto a substrate, thereby generating images on the substrate; and (3) exposing the substrate to microwave radiation, thereby drying the images on the substrate.

7 Claims, 3 Drawing Sheets

5,563,644

INK JET PRINTING PROCESSES WITH MICROWAVE DRYING

BACKGROUND OF THE INVENTION

The present invention is directed to printing processes employing microwave image drying techniques. More specifically, the present invention is directed to printing processes which comprise applying in imagewise fashion to a substrate an ink composition which comprises an aqueous liquid vehicle, a colorant, and a drying component selected from the group consisting of zwitterionic compounds (ionic compounds carrying both a positive charge and a negative charge), and subsequently exposing the substrate to microwave radiation, thereby drying the images on the substrate. Any printing process suitable for use with aqueous-based inks can be employed. A preferred embodiment of the present invention is directed to ink jet printing processes using specific ink compositions and employing microwave drying of the printed images One specific embodiment of the present invention is directed to a thermal ink jet printing process which comprises (1) incorporating into a thermal ink jet printing apparatus an ink composition which comprises an aqueous liquid vehicle, a colorant, and a drying component selected from the group consisting of zwitterionic compounds; (2) heating the ink in an imagewise pattern to cause bubbles to form therein, thereby causing droplets of the ink to be ejected in an imagewise pattern onto a substrate, thereby generating images on the substrate; and (3) exposing the substrate to microwave radiation, thereby drying the images on the substrate.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, they are much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation add directionality, thus impacting the system's ability to produce high quality prints. Drop-on-demand systems which use piezoelectric devices to expel the droplets also suffer the disadvantage of a slow printing speed.

The second type of drop-on-demand system is known as thermal ink jet, or bubble jet, and produces high velocity droplets and allows very close spacing of nozzles. The major components of this type of drop-on-demand system are an ink-filled channel having a nozzle on one end and a heat generating resistor near the nozzle. Printing signals representing digital information originate an electric current pulse in a resistive layer within each ink passageway near the orifice or nozzle causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described, for example, in U.S. Pat. Nos. 4,601,777, 4,251,824, 4,410,899, 4,412,224, and 4,532,530, the disclosures of each of which are totally incorporated herein by reference.

U.S. Pat. No. 3,673,140 (Ackerman et al.) discloses a printing ink composition, preferably comprising epoxidized soybean oil acrylate or certain derivatives thereof and a radiation sensitizer having a triplet energy between about 42 and 85 kilocalories per mole. The inks are used in a printing method which comprises exposing the inks to an amount of actinic radiation effective to polymerize the inks to a non-offsetting state. In addition, U.S. Pat. No. 3,801,329 (Sandner et al.) discloses coating compositions comprising a liquid vehicle, a colorant, and a photosensitizer containing a specific structural group. The curable composition is cured by exposure to radiation, preferably between 2,000 and 8,000 Angstroms. Further, U.S. Pat. No. 4,088,618 (Saltzman et al.) and U.S. Pat. No. 4,104,143 (Wasilewski et al.) disclose photocurable printing inks and coating compositions comprising an ethylenically unsaturated monomeric compound, a photoinitiator, and an optional colorant as well as certain rosin-modified epoxy resins. The compositions disclosed in these patents can be irradiated by a variety of methods, such as exposing the composition to ultraviolet radiation, electron beams, or gamma radiation emitters.

U.S. Pat. No. 4,206,937 (Huston) discloses a preprinted spirit duplicating master. A liquid ink composition composed of 40 to 62 percent by weight of a dye, 40 to 65 percent by weight of an alcohol soluble polyamid resin having a melting point in the range of 110° to 125° C., and 12 to 25 percent by weight of ethylene glycol is printed in reverse image on one side of a translucent paper sheet. After printing, the ink is dried to evaporate a portion of the ethylene glycol so that the dried ink contains approximately 3.0 to 6.25 percent by weight of ethylene glycol. Drying is by heating by any suitable method, such as infrared radiation, microwave drying, gas flame heating, or the like. The polyamid resin is soluble in alcohol so that multiple copies can be printed from the master using conventional duplicating equipment, and as the ink does not contain oils and greases there is no tendency of the ink to bleed or smear so that the masters can be bound in booklet form without the need of separating tissue sheets. As the sheet is translucent, the printing can be seen in positive image through the sheet so that no positive image printing is required on the front surface of the sheet.

U.S. Pat. No. 4,839,142 (Charm), the disclosure of which is totally incorporated herein by reference, discloses a high temperature, short time heating system and method for the pasteurization and/or sterilization of heat sensitive biological fluids which comprises adding a dielectric enhancing additive to the biological fluid, subjecting the biological fluid to microwave energy to heat rapidly the biological fluid for a short time period to a pasteurizing or sterilization temperature, cooling the biologic al fluid, optionally removing the dielectric enhancing additive, and recovering an aseptic biological fluid. Examples of dielectric enhancing additives include inorganic metal or ionic salts, such as alkali or alkaline earth salts, such as sodium chloride.

U.S. application Ser. No. 07/830,163, now U.S. Pat. No. 5,220,346, filed concurrently herewith, entitled "Printing Processes With Microwave Drying," with the named inventors Leonard M. Carreira, Arthur M. Gooray, Kenneth C. Peter, Louis V. Isganitis, and Edward J. Radigan, discloses printing processes which comprise applying in imagewise fashion to a substrate an ink composition which comprises an aqueous liquid vehicle, a colorant, and an ionic compound at least partially ionizable in the liquid vehicle, said ink composition having a conductivity of at least about 10 milliSiemens per centimeter, and subsequently exposing the substrate to microwave radiation, thereby drying the images on the substrate.

Although known compositions and processes are suitable for their intended purposes, a need remains for ink jet printing processes with rapid output times. In addition, there is a need for ink jet printing processes employing microwave drying of the images. Further, there is a need for thermal ink jet printing processes that enable output speeds of at least 10 prints per minute, as well as slower output speeds. There is also a need for ink jet printing processes employing microwave drying wherein the microwave drying apparatus has reduced power requirements. Further, a need exists for thermal ink jet printing processes with fast image drying times and with reduced paper cockle. In addition, there is a need for printing processes for which aqueous-based inks are suitable and which employ microwave drying of the printed images. Additionally, there is a need for ink jet printing processes employing microwave drying of the images for which the inks have a reduced tendency to dry out and clog the nozzles (thus making them unworkable) and for which the inks enable easy clearing of clogged nozzles that have dried out. There is also a need for ink jet printing processes employing microwave drying of the images wherein the ink compositions used have a reduced tendency to migrate through the glass insulating layers in thermal ink jet apparatuses and lead to device failure.

SUMMARY OF THE INVENTION

It is an object of the present invention to provide ink jet printing processes with rapid output times.

It is another object of the present invention to provide ink jet printing processes employing microwave drying of the images.

It is yet another object of the present invention to provide thermal ink jet printing processes that enable output speeds of at least 10 prints per minute, as well as slower output speeds.

It is still another object of the present invention to provide ink jet printing processes employing microwave drying wherein the microwave drying apparatus has reduced power requirements.

Another object of the present invention is to provide thermal ink jet printing processes with fast image drying times and with reduced paper cockle.

Yet another object of the present invention is to provide printing processes for which aqueous-based inks are suitable and which employ microwave drying of the printed images.

Still another object of the present invention is to provide ink jet printing processes employing microwave drying of the images for which the inks have a reduced tendency to dry out and clog the nozzles (thus making them unworkable) and for which the inks enable easy clearing of clogged nozzles that have dried out.

It is another object of the present invention to provide ink jet printing processes employing microwave drying of the images wherein the ink compositions used have a reduced tendency to migrate through the glass insulating layers in thermal ink jet apparatuses and lead to device failure.

These and other objects of the present invention (or specific embodiments thereof) can be achieved by providing a printing process which comprises applying in imagewise fashion to a substrate an ink composition which comprises an aqueous liquid vehicle, a colorant, and a drying component selected from the group consisting of zwitterionic compounds, and subsequently exposing the substrate to microwave radiation, thereby drying the images on the substrate. Another embodiment of the present invention is directed to a thermal ink jet printing process which comprises (1) incorporating into a thermal ink jet printing apparatus an ink composition which comprises an aqueous liquid vehicle, a colorant, and a drying component selected from the group consisting of zwitterionic compounds; (2) heating the ink in an imagewise pattern to cause bubbles to form therein, thereby causing droplets of the ink to be ejected in an imagewise pattern onto a substrate, thereby generating images on the substrate; and (3) exposing the substrate to microwave radiation, thereby drying the images on the substrate.

DETAILED DESCRIPTION OF THE INVENTION

Figure 1A:
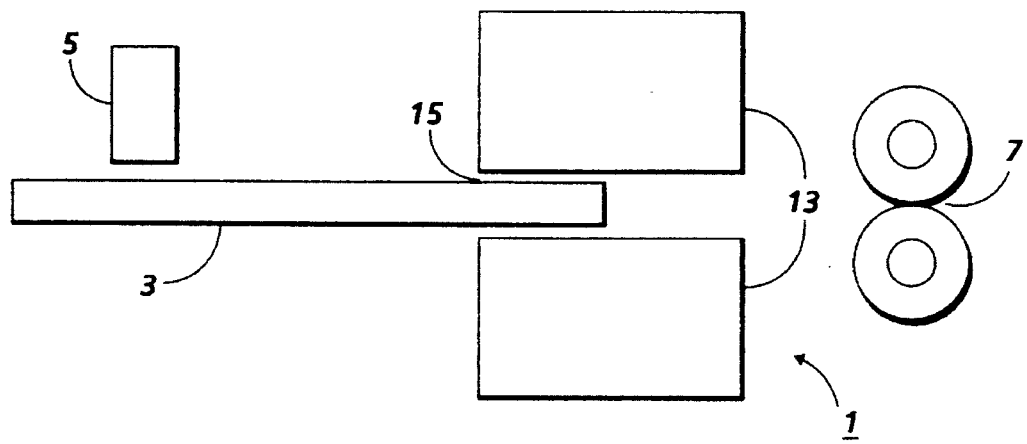
FIGS. 1A, 1B, 1C and 2 illustrate schematically one printing system with a microwave drying apparatus suitable for the process of the present invention.

The liquid vehicle of the inks employed for the process of the present invention may consist of water, or it may comprise a mixture of water and a miscible organic component, such as ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, dimethylsulfoxide, sulfolane, alcohol derivatives, carbitol, butyl carbitol, cellusolve, ether derivatives, amino alcohols, ketones, and other water miscible materials, as well as mixtures thereof. When mixtures of water and water miscible organic liquids are selected as the liquid vehicle, the water to organic ratio may be in any effective range, and typically is from about 100:0 to about 30:70, preferably from about 97:3 to about 50:50. The non-water component of the liquid vehicle generally serves as a humectant which has a boiling point higher than that of water (100° C.). In the inks employed for the process of the present invention, the liquid vehicle is generally present in an amount of from about 50 to about 99.5 percent by weight, and preferably from about 60 to about 90 percent by weight.

The colorant for the inks employed for the process of the present invention can be a dye. Examples of suitable dyes include anthraquinones, monoazo dyes, disazo dyes, phthalocyanines, aza[18]annulenes, formazan copper complexes, triphenodioxazines, Bernacid Red 2BMN; Pontamine Brilliant Bond Blue A; Pontamine; Food Black 2; Carodirect Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Direct Brilliant Pink B (Crompton-Knolls), Aizen Spilon Red C-BH (Hodagaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Sirius Supra Yellow GD 167; Cartasol Brilliant Yellow 4GF (Sandoz); Pergasol Yellow CGP (Ciba-Geigy); Dermacarbon 2GT (Sandoz); Pyrazol Black BG (ICI); Morfast Black Conc A (Morton-Thiokol); Diazol Black RN Quad (ICI); Luxol Blue MBSN (Morton-Thiokol); Sevron Blue 5GMF (ICI); Basacid Blue 750 (BASF); Bernacid Red, available from Berncolors, Poughkeepsie, N.Y.; Pontamine Brilliant Bond Blue; Berncolor A. Y. 34; Telon Fast Yellow 4GL-175; BASF Basacid Black SE 0228; the Pro-Jet series of dyes available from ICI, including Pro-Jet Yellow I (Direct Yellow 86), Pro-Jet Magenta I (Acid Red 249), Pro-Jet Cyan I (Direct Blue 199), Pro-Jet Black I (Direct Black 168), Pro-Jet Yellow 1-G (Direct Yellow 132), Aminyl Brilliant Red F-B, available from Sumitomo Chemical Co. (Japan), the Duasyn line of "salt-free" dyes available from Hoechst, such as Duasyn Direct Black HEF-SF (Direct Black 168), Duasyn Black RL-SF (Reactive Black 31), Duasyn Direct Yellow 6G-SF VP216 (Direct Yellow 157), Duasyn Brilliant Yellow GL-SF VP220 (Reactive Yellow 37), Duasyn Acid Yellow XX-SF VP413 (Acid Yellow 23), Duasyn Brilliant Red F3B-SF VP218 (Reactive Red 180), Duasyn Rhodamine B-SF VP353 (Acid Red 52), Duasyn Direct Turquoise Blue FRL-SF VP368 (Direct Blue 199), Duasyn Acid Blue AE-SF VP344 (Acid Blue 9), and the like, as well as mixtures thereof. The dye is present in any effective amount, typically from about 1 to about 30 percent by weight, and preferably from about 2 to about 10 percent by weight.

In addition, the colorant for the ink compositions of the present invention can be a pigment, or a mixture of one or more dyes and/or one or more pigments. The pigment can be black, cyan, magenta, yellow, red, blue, green, brown, mixtures thereof, and the like. Examples of suitable black pigments include various carbon blacks such as channel black, furnace black, lamp black, and the like. Colored pigments include red, green, blue, brown, magenta, cyan, and yellow particles, as well as mixtures thereof. Illustrative examples of magenta pigments include 2,9-dimethyl-substituted quinacridone and anthraquinone dye, identified in the Color Index as CI 60710, CI Dispersed Red 15, a diazo dye identified in the Color Index as CI 26050, CI Solvent Red 19, and the like. Illustrative examples of suitable cyan pigments include copper tetra-4-(octadecyl sulfonamido) phthalocyanine, X-copper phthalocyanine pigment, listed in the color index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro- 2,5-dimethoxy aceto-acetanilide, Permanent Yellow FGL, and the like. Additional examples of pigments include Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (American Hoechst), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Co.), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF). Additional suitable commercially available pigment dispersions include the Hostafines available from Hoechst, including Hostafine Black T, Hostafine Black TS, Hostafine Yellow HR, Hostafine Yellow GR, Hostafine Red FRLL, Hostafine Rubine F6B, and Hostafine Blue B2G, as well as dispersions available from BASF, including Disperse Black 00- 6607, Luconyl Yellow 1250, Basoflex Pink 4810, Luconyl Blue 7050, and the like. Other pigments can also be selected. Preferably, the pigment particle size is as small as possible to enable a stable colloidal suspension of the particles in the liquid vehicle and to prevent clogging of the ink channels when the ink is used in a thermal ink jet printer. Preferred particle average diameters are generally from about 0.001 to about 5 microns, and more preferably from about 0.1 to about 1 micron, although the particle size can be outside these ranges. The pigment is present in the ink composition in any effective amount, generally from about 1 to about 20 percent by weight and preferably from about 4 to about 8 percent by weight, although the amount can be outside of these ranges.

Other additives can also be present in the inks employed in the process of the present invention. For example, surfactants or wetting agents can be added to the ink. These additives may be of the cationic, anionic, or nonionic types. Suitable surfactants and wetting agents include Tamol®SN, Tamol®LG, those of the Triton® series available from Rohm and Haas Co., those of the Marasperse® series, those of the Igepal® series available from GAF Co., those of the Tergitol® series, those of the Duponol® series available from E. I. Du Pont de Nemours & Co., Emulphor ON 870 and ON 877, available from GAF, and other commercially available surfactants. These surfactants and wetting agents are present in effective amounts, generally from 0 to about 15 percent by weight, and preferably from about 0.01 to about 8 percent by weight.

Polymeric additives can also be added to the inks employed in the process of the present invention to enhance the viscosity of the ink, including water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, polyethyleneimines derivatized with polyethylene oxide and polypropylene oxide, such as the Discole series available from DKS International, the Jeffamine® series available from Texaco, and the like. Polymeric additives may be present in the ink of the present invention in amounts of from 0 to about 10 percent by weight, and preferably from about 0.01 to about 5 percent by weight.

Other optional additives to the inks employed in the process of the present invention include biocides such as Dowicil 150, 200, and 75, benzoate salts, sorbate salts, and the like, present in an amount of from about 0.0001 to about 4 percent by weight, and preferably from about 0.01 to about 2.0 percent by weight, humectants and penetration control additives such as ethylene glycol, diethyleneglycol, N-methylpyrrollidinone, propylene glycol, hydroxyethers, ethers, amides, sulfoxides, ketones, lactones, esters, alcohols, butyl carbitol, benzyl alcohol, cyclohexylpyrrolidinone, 1,2-hexanediol, and the like, present in an amount of from 0 to about 50 percent by weight, and preferably from about 5 to about 40 percent by weight, pH controlling agents such as acids or, bases, phosphate salts, carboxylates salts, sulfite salts, amine salts, and the like, present in an amount of from 0 to about 1 percent by weight and preferably from about 0.01 to about 1 percent by weight, or the like.

Other examples of suitable ink additives include those disclosed in U.S. application Ser. No. 07/738,024, now U.S. Pat. No. 5,223,026 and U.S. application Ser. No. 07/738, 021, now U.S. Pat. No. 5,207,825, the disclosures of each of which are totally incorporated herein by reference.

The inks employed in the process of the present invention contain a drying component. The drying component is generally referred to as being a zwitterionic compound. The term "zwitterionic compound" means a material that carries both a positive charge and a negative charge in aqueous solutions. One example of a zwitterionic compound is betaine, of the formula:

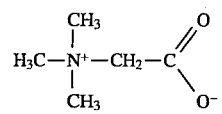

which exists as a zwitterion over a wide range of pHs. Another example is an amino acid such as proline, which at its isoelectric point exists predominantly as the zwitterionic species. At other pHs, protonated and deprotonated species can exist in equilibrium with the zwitterionic form: For the purposes of the present invention, the selection of zwitterionic compounds is not limited to materials or solutions in which the zwitterionic drying component is in the zwitterionic form, i.e., not limited to solutions near the isoelectric point of the zwitterionic drying component. The zwitterionic materials employed as drying components will enhance the

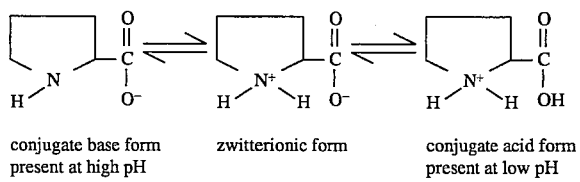

conjugate base form        zwitterionic form        conjugate acid form
present at high pH                                   present at low pH microwave drying of the ink at pHs far from the isoelectric point, and it may be desirable to maintain the ink at a pH far from the isoelectric point of the zwitterionic drying component for several reasons, such as enhancing the solubility of the zwitterionic compound in the ink.

Additional examples of suitable drying components include inner salts, such as betaine (CAS No. 107-43-7) and betaine monohydrate (CAS No. 590-47-6), available from Aldrich Chemicals, Milwaukee, Wis., PPS (1-(3-sulfopropyl)-pyridinium betaine) (CAS No. 15471-17-7), available from Rasching Corp., Richmond, Va., PPS-OH (1-(2-hydroxy-3-sulfopropyl)pyridinium betaine) (CAS No. 3918-73-8), available from Rasching Corp., Richmond, Va., and the like, as well as mixtures thereof; amino acids, including glycine (CAS No. 56-40-6), glycine hydrochloride (CAS No. 6000- 43-7), D,L-alanine (CAS No. 302-72-7), D,L-lysine (CAS No. 70-54-2), L-arginine (CAS No. 74-79-3), L-proline (CAS No. 147-85-3), trans-4-hydroxy-L-proline (CAS No. 51-35-4), available from Aldrich Chemicals, Milwaukee, Wis., and any other amino acids exhibiting sufficient solubility in water to be suitable ink components, as well as mixtures thereof; zwitterionic buffers, such as N-(2-acetamido)-2-aminomethanesulfonic acid, N-(2-acetamido)aminodiacetic acid, N,N-bis(2-hydroxyethyl)-2-aminoethanesulfonic acid, N,N-bis(2-hydroxyethyl)-3-amino-2-hydroxypropanesulfonic acid, N,N-bis(2-hydroxyethyl)glycine, 2-(cyclohexylamino)ethanesulfonic acid, 3-(cyclohexylamino)-1-propanesulfonic acid, N-(1,1-dimethyl-2-hydroxyethyl)-3-amino-2-hydroxypropanesulfonic acid, glycyl-glycine, glycyl-glycyl-glycine, 4-(2-hydroxyethyl)piperazine- 1-ethanesulfonic acid, 4-(2-hydroxyethyl)piperazine- 1-(2-hydroxypropanesulfonic acid), 4-(2-hydroxyethyl)piperazine- 1-propanesulfonic acid, 2-morpholinoethanesulfonic acid monohydrate, 3-morpholino-2-hydroxypropanesulfonic acid, 3-morpholinopropanesulfonic acid, piperazine-1,4-bis(2-ethanesulfonic acid), piperazine-1,4-bis(2-hydroxypropanesulfonic acid, taurine, N-tris(hydroxy-methyl)methyl-2-aminoethanesulfonic acid, N-[tris(hydroxymethyl)methyl]-3-amino-2-hydroxypropanesulfonic acid, N-[tris(hydroxymethyl)methyl]-3-aminopropanesulfonic acid, N-[tris(hydroxymethyl)methyl]glycine, all available from Fluka Chemical Corp., Ronkonkoma, N.Y., and the like, as well as mixtures thereof; zwitterionic compounds such as β-alanine, 4-aminobutyric acid, 6-aminocaproic acid, aminoethanesulfonic acid, 3-aminopropylsulfonic acid, picolinic acid, sarcosine, 2-aminoethylhydrogen sulfate, all available from Aldrich Chemicals, Milwaukee, Wis., and the like, as well as mixtures thereof; and any mixture of the above. The drying component is selected to exhibit sufficient solubility in the aqueous solution of the ink composition to achieve the objectives of the present invention; typically, the solubility is at least about 2 percent by weight in the solution (wherein about 2 grams of the drying component are present in a 100 gram sample of the ink), and preferred solubilities typically range from about 5 to about 30 percent by weight in the solution. Some suitable compounds, such as many of the amino acids, may exhibit relatively low solubility in aqueous solutions at or near neutral pH, but can be made more soluble at a pH far from their isoelectric point. The drying component is present in the ink in any effective amount. The actual amount selected may depend on the solubility of the selected component in the aqueous ink composition and on the molecular weight of the selected drying component. Typical amounts of the drying component are from about 5 to about 50 percent by weight, preferably from about 5 to about 30 percent by weight, although the amount can be outside of these ranges.

Inks suitable for the present invention can be prepared by any process suitable for preparing aqueous-based inks. For example, the ink ingredients can be mixed in the desired amounts and stirred until a uniform ink composition results (typically about 30 minutes, although the mixing/stirring time can be either greater or less than this period). While not required, the ink ingredients can be heated during mixing if desired. Subsequent to mixing and stirring, the ink composition generally is filtered to remove any solid or particulate matter. The microwave drying component of the ink can be added with the other ink ingredients during preparation of the ink; alternatively, the microwave drying component can be added to an ink composition subsequent to mixing and stirring of the other ingredients. Any other suitable processes for preparing the inks can also be employed.

The ink is applied to a suitable substrate in imagewise fashion. Application of the ink to the substrate can be by any suitable process compatible with aqueous-based inks, such as flexographic printing, pen plotters, continuous stream ink jet printing, drop-on-demand ink jet printing (including both piezoelectric and thermal ink jet processes), or the like. The substrate employed can be any substrate compatible with aqueous-based inks, including plain paper, such as Xerox® series 10 paper, Xerox® 4024 paper, or the like, coated papers, such as those available from Jujo, transparency materials suitable for aqueous inks or ink jet printing processes, or the like.

Figure 1B:
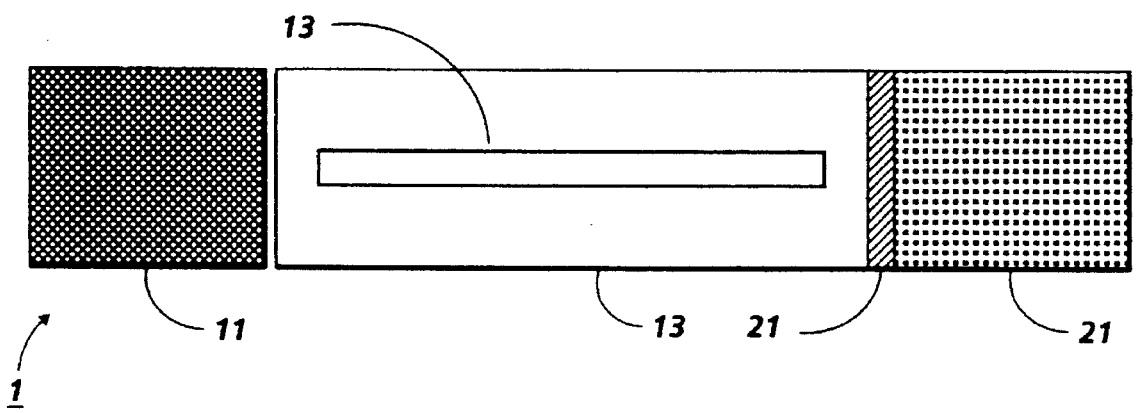
Figure 1C:
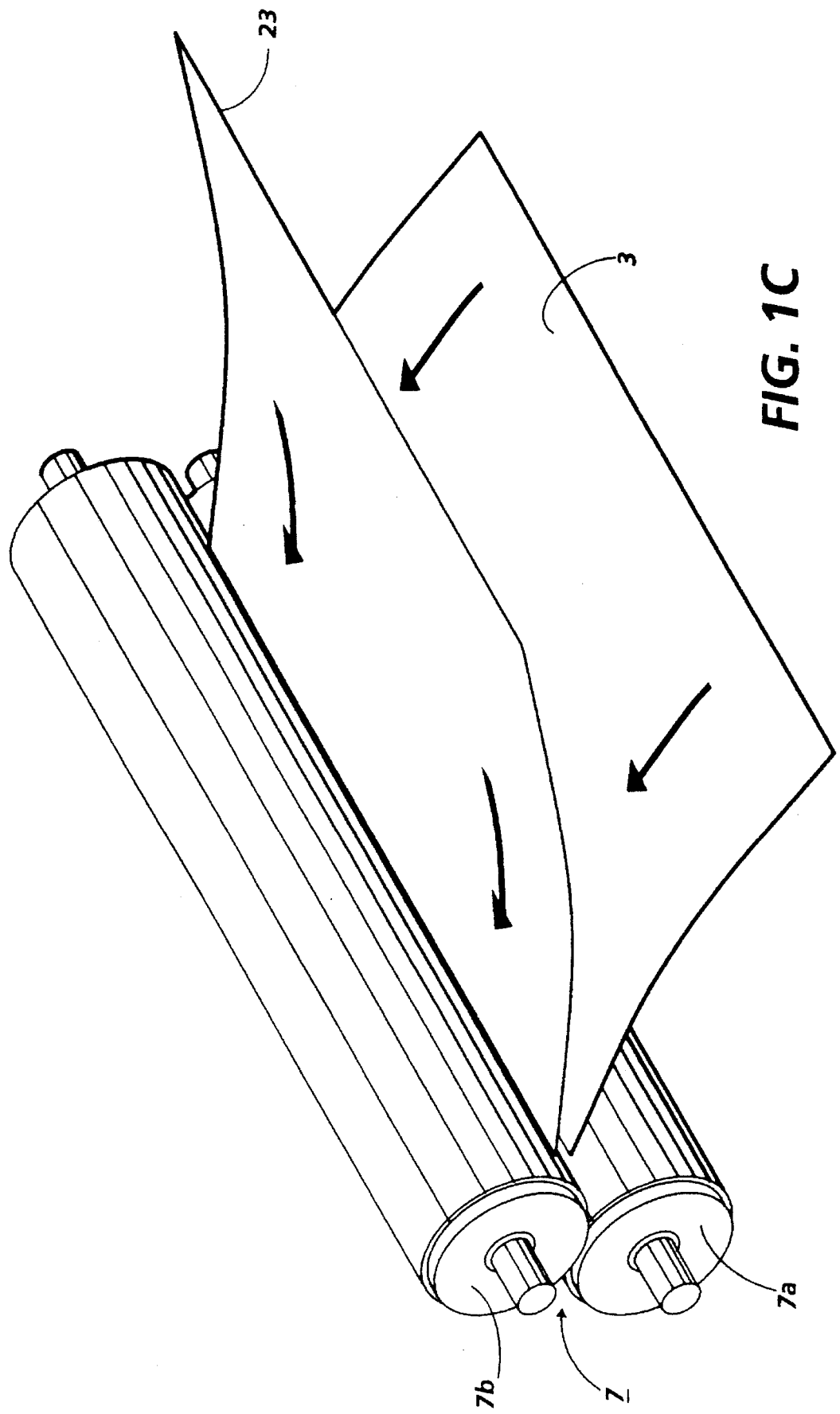

Any suitable microwave apparatus can be employed for the ink drying step of the present invention. One example of a printing system including a suitable microwave apparatus for drying ink on substrates and an optional method of testing the degree of drying is illustrated schematically in FIGS. 1A, 1B, and 1C. FIG. 1A represents a schematic side view of the apparatus wherein the paper path is from left to right. FIG. 1B represents a schematic side view of the apparatus viewed down the paper path. FIG. 1C represents a schematic view of the testing apparatus for determining the degree of drying. As illustrated schematically in FIGS. 1A, 1B, and 1C, microwave drying apparatus 1 is situated so that printing substrate 3, which can be paper, transparency material, or the like, is first printed with print head 5, passes through drying apparatus 1, and then exits drying apparatus 1 and passes through optional offset nip 7 which comprises two rollers, which preferably are a soft driver roll 7a (of a material such as rubber, for example) and a rigid idler roll 7b (coated with a material such as Teflon®, for example). Apparatus 1 comprises magnetron 11 connected to rectangular wave guide 13 equipped with slot 15. One example of a suitable magnetron is the Gerling GL 116, available from John Gerling Co., Modesto, Calif. One example of a suitable waveguide is the WR 284, available from Microwave Development Lab, Natick, Mass. Slot 15 permits the printing substrate 3 to be passed through apparatus 1. At the terminal point of the wave guide 13 is a water cooled terminating dummy load 19 which absorbs any unused energy. Situated between wave guide 13 and terminating load 19 is a resonating iris 21 which generates high intensity traveling waves, which result in localized "hot spots" where the electric field is at a maximum. The print head 5 is aligned to coincide with a "hot spot." After print head 5 prints an image on printing substrate 3, printing substrate 3 passes through slot 15 in wave guide 13, whereupon a fixed amount of microwave power, generally from about 100 to about 1,000 watts, although the amount can be outside of this range, is supplied to the wave guide 13. Printing substrate 3 is passed through apparatus 1 at any suitable speed, typically from about 1.5 to about 40 inches per second. Optionally, after exiting apparatus 1 and wave guide 13, printing substrate 3 can be placed into contact with a blank sheet of paper 23 and the "sandwich" thus created can be passed through offset nip 7 to evaluate the effectiveness of the drying step. The nip pressure is set at the minimum to achieve the greatest level of offset. For example, with 14.25 inch rollers, an appropriate pressure would be about 0.25 pounds as measured at each end of the rollers. After exiting the nip, the sheets are separated and the offset density that is transferred to the blank sheet is measured. For comparison purposes, the process is repeated by passing the printed sheet through slot 15 with the microwave power off, and the degree of offset obtained with and without microwave drying are compared.

Any other suitable microwave drying apparatus can also be employed.

Offset is a practical measure of the state of dryness of the image; the degree of image drying at the time the image is contacted with a second sheet and passed through the pressure nip determines the amount of ink offset onto the second sheet, so that little or no offset to the second sheet occurs when the original image has reached an acceptable state of dryness. Some images can be prepared with inks that have a high absorptivity into the paper such that no offset is observed. In this instance, the image can pass through the roller with no offset being observed even if no microwave power is previously applied to the image. In this instance, "drying" is achieved by fast penetration of the ink into the bulk of the paper from the paper surface. Images made with such an ink, however, are characterized by a high degree of image showthrough, or visibility of the image on the side of the paper opposite to that bearing the image. With such inks, occurrences of image strikethrough are common, where the ink is seen to have penetrated completely through the paper and emerged on the reverse side. Images made with such inks also tend to have lower optical density and to be poorer in other measures of image quality such as edge raggedness. In addition, the prints will have a high degree of cockle if no microwave drying is used. Turning the microwave power on to a sufficient level with any ink of this type with the proper level of conductivity can remove the cockle, but the other image quality defects will remain. Thus, it may be desirable to select an ink that penetrates the paper somewhat less rapidly and that is suitable for microwave drying. However, a suitable level of penetration of the ink into the paper is also desirable. Inks with insufficient levels of penetration into the paper may require higher levels of microwave power to dry, may be prone to image defects as a result of ink boiling and splattering, and may be prone to unacceptable mottle or nonuniformity in solid areas.

Accordingly, in a preferred embodiment, the ink is selected to exhibit an optimal degree of penetration into the substrate. Prints generated by exposing to microwave radiation images made with inks containing zwitterionic compounds and exhibiting relatively rapid substrate penetration rates exhibit increased drying times compared to prints generated by exposing to microwave radiation images made with inks containing zwitterionic compounds and exhibiting relatively slow substrate penetration rates. The desired degree of penetration will depend in part upon the nature of the substrate selected, the importance of high image quality (image quality tends to be decreased by increased penetration rates), and whether disadvantages such as image showthrough are important in the particular application. The penetration rates of aqueous inks into substrates such as paper can be increased by including penetration enhancers in the ink. Examples of materials that enhance penetration rates include polyethyleneimines derivatized with polyethylene oxide and polypropylene oxide, such as the Discole series available from DKS International, Tokyo, Japan, the Jeffamine® series available from Texaco, Bellaire, Tex., and the like, N-methylpyrrolidinone, dimethylsulfoxide, cyclohexylpyrrolidinone, 1,2-hexanediol, and butyl carbitol, available from Aldrich Chemical Co., Milwaukee, Wis., and the like, as well as mixtures thereof. The penetration enhancer can be present in any effective amount, typically from about 0.0001 to about 10 percent by weight of the ink, and preferably from about 0.01 to about 4 percent by weight, although the amount can be outside these ranges.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Figure 2:
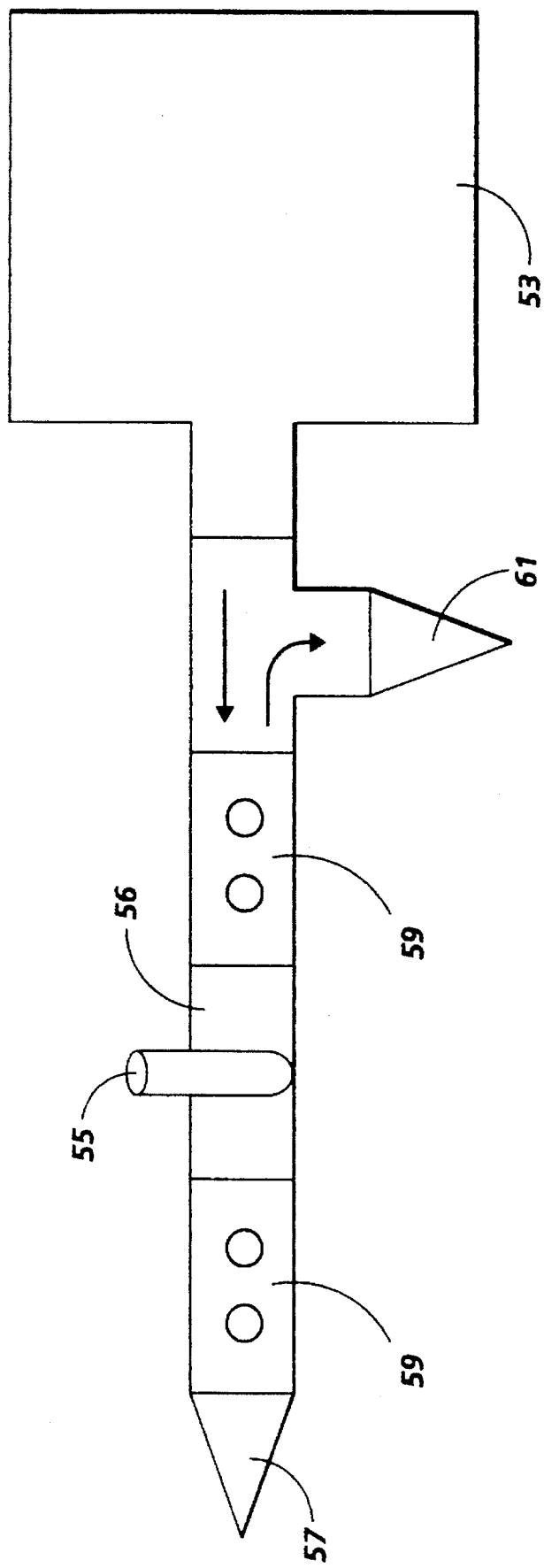

Each of the compounds listed in the table below was dissolved in water to make a 20 percent by weight aqueous solution. The solutions were then tested for the absorption of microwave energy by placing 1.75 grams of the sample solution in a polystyrene test tube and placing the test tube in a test fixture as illustrated schematically in cross-section in FIG. 2. As shown in FIG. 2, apparatus 51 (equipment all provided by John Gerling Co., Modesto, Calif., model numbers provided after reference numbers) comprises magnetron 53 (GL 116), test tube 55, test tube applicator 56 (GL 503), short dummy load 57 (GL 402A), directional power transducer 59 (dummy directional coupler GL 214), and three-part circulator 61 (GL 401A). Magnetron 53 sends energy down straight applicator 56 and the energy is terminated at water cooled dummy load 57, which ensures that no energy is reflected. The straight applicator 56 has a hole for the insertion of a test tube 55. The magnetron timer was set for a 4 second on-time duration, and the power output of the magnetron was varied at 250, 300, and 350 Watts. Energy input into the sample in the test tube was recorded by directional couplers 59 placed before and after the test tube coupler. The solution sample of 1.75 grams was placed in the tared polystyrene test tube and the ambient temperature was recorded by using a thermocouple. The thermocoupler bead was dipped ⅔ of the way into the sample to record the temperature. Subsequently, the thermocoupler bead was rinsed with distilled water and wiped dry. The sample was then placed into the test tube coupler chamber, and microwave power was applied for the fixed time of 4 seconds. Immediately after the magnetron was switched off, the sample was capped with a thumb and gently rolled over to ensure uniform temperature. The temperature of the sample was then recorded with the thermocouple. The directional couplers provided information regarding the energy input and the energy going to the terminator; the difference between the two yields the energy absorbed by the sample. Each sample was run at the three aforementioned magnetron power levels, with the initial temperature, the post-heating temperature, and the energy input into the waveguide recorded with each trial. Each test tube was exposed to microwave radiation for a period of 4 seconds (from t=0 to t=4 seconds), and one second after microwave radiation ceased (at t=5 seconds), the temperature of the solution in the test tube was measured. The values for the temperature increase at 300 Watts of microwave power input to the waveguide in the microwave apparatus were as follows for each of the solutions:

| Drying Component | pH | Conductivity (milliSiemens/cm) | Temperature Rise at 300 Watts (°F.) |
| --- | --- | --- | --- |
| Betaine | 7.24 | 0.032 | 47 |
| Betaine Hydrochloride | 0.81 | 92.1 | 52 |
| Betaine Monohydrate | 7.26 | 0.018 | 46 |
| PPS(1-(3-sulfopropyl)-pyridinium betaine)* | 4.07 | 0.114 | 46 |
| PPS-OH(1-(2-hydroxy-3-sulfopropyl)-pyridinium betaine)* | 4.85 | 48.5 | 52 |
| Deionized water (control) | 7.1 | 0.0008 | 17 |

*obtained from Rasching Corp., Richmond, VA

As the data indicate, solutions containing the drying component exhibited significantly greater temperature rises upon exposure to microwave radiation than did the control. The effect of the drying agents upon microwave absorption appears to be the result of a factor other than increased conductivity of the solution. As indicated, the betaine hydrochloride solution, with a conductivity over $10^3$ times greater than the conductivity of the betaine solution, exhibited only a slightly higher temperature increase. Similarly, while the relatively highly conductive PPS-OH solution exhibited a temperature rise of 52, the PPS solution, which is more than 400 times less conductive, exhibits a temperature increase of 46, which is nearly as high as that observed for the PPS-OH solution.

EXAMPLE II

Each of the compounds listed in the table below was dissolved in water to make a 20 percent by weight aqueous solution. The solutions were then tested for the absorption of microwave energy as described in Example I. The values for the temperature increase at 300 Watts of microwave power input to the waveguide in the microwave apparatus were as follows for each of the solutions:

| Drying Component | pH | Conductivity (milliSiemens/cm) | Temperature Rise at 300 Watts (°F.) |
| --- | --- | --- | --- |
| Glycine | 7.2 | 0.081 | 43 |
| Glycine Hydrochloride | 0.6 | 122.2 | 49 |
| D,L-Alanine | 6.2 | 0.091 | 46 |
| D,L-Lysine | 10.5 | 4.04 | 46 |
| L-Lysine Monohydrochloride | 5.6 | 49.7 | 53 |
| L-Arginine | 11.7 | 0.481 | 39 |
| L-Arginine Hydrochloride | 5.3 | 43.3 | 52 |
| L-Proline | 6.3 | 0.005 | 47 |
| L-Proline + HCl to pH = 4.2 | 4.2 | 0.75 | 45 |
| L-Proline + NaOH to pH = 9.0 | 9.0 | 1.41 | 44 |
| Trans-4-hydroxyl-L-proline | 5.8 | 0.012 | 42 |
| Deionized water (control) | 7.1 | 0.0008 | 17 |

As the data indicate, solutions containing the drying component exhibited significantly greater temperature rises upon exposure to microwave radiation than did the control. The effect of the drying agents upon microwave absorption appears to be the result of a factor other than increased conductivity of the solution. For example, the corresponding hydrochloride compounds of glycine, lysine, and arginine have much higher conductivities than the compounds themselves, while the corresponding temperature increases are only slightly greater for the hydrochloride compounds.

EXAMPLE III

Each of the compounds listed in the table below was dissolved in water to make a 20 percent by weight aqueous solution. For some of the compounds, this concentration exceeded the material's solubility limit in water. The solutions were then tested for the absorption of microwave energy as described in Example I. The values for temperature at varying levels of microwave power input to the waveguide in the microwave apparatus were as follows for each of the solutions:

| Drying Component | pH | Conductivity (milliSiemens/cm) | Temperature Rise at 300 Watts (°F.) |
| --- | --- | --- | --- |
| N-(2-acetamido)-2-aminomethanesulfonic acid* | 2.5 | 2.21 | 32 |
| N-(2-acetamido)aminodiacetic acid* | 2.5 | 3.08 | 22 |
| N,N-bis(2-hydroxyethyl)-2-aminoethanesulfonic acid | 3.7 | 0.069 | 42 |
| N,N-bis(2-hydroxyethyl)-3-amino-2-hydroxypropanesulfonic acid* | 4.0 | 0.093 | 41 |
| N,N-bis(2-hydroxyethyl)glycine | 4.9 | 0.059 | 39 |
| 2-(cyclohexylamino)ethanesulfonic acid | 4.9 | 0.006 | 36 |
| 3-(cyclohexylamino)-1-propanesulfonic acid* | 3.4 | 0.143 | 36 |
| N-(1,1-dimethyl-2-hydroxyethyl)-3-amino-2-hydroxy-propanesulfonic acid | 2.5 | 1.68 | 39 |
| glycyl-glycine* | 5.8 | 0.210 | 48 |
| 4-(2-hydroxyethyl)piperazine-1-ethanesulfonic acid | 5.4 | 0.152 | 41 |
| 4-(2-hydroxyethyl)piperazine-1-propanesulfonic acid | 6.0 | 0.194 | 38 |
| 2-morpholinoethanesulfonic acid monohydrate* | 3.2 | 0.191 | 36 |
| 3-morpholino-2-hydroxypropanesulfonic acid | 3.5 | 0.081 | 38 |
| 3-morpholinopropanesulfonic acid | 2.8 | 0.728 | 40 |
| piperazine-1,4-bis(2-ethanesulfonic acid)* | — | 0.8 | 19 |
| taurine* | 4.6 | 0.021 | 45 |
| N-tris(hydroxy-methyl)methyl-2-aminoethanesulfonic acid | 3.8 | 0.096 | 36 |
| N-[tris(hydroxymethyl)methyl]-3-amino-propanesulfonic acid | 3.5 | 0.081 | 36 |
| N-[tris(hydroxymethyl) methyl]glycine | 5.0 | 0.073 | 34 |
| Deionized water (control) | 7.1 | 0.0008 | 17 |

*20% by weight exceeds the solubility of this compound in water
— = not measured As the data indicate, in most instances, solutions containing the drying component exhibited significantly greater temperature rises upon exposure to microwave radiation than did the control, despite the fact that some of the drying component compounds were not soluble in water at a concentration of 20 percent by weight. Notable exceptions were N-(2-acetamido)aminodiacetic acid and piperazine-1,4-bis(2-ethanesulfonic acid), which were particularly insoluble in the solutions as prepared. However, it should be noted that the solubility of these materials could be increased in water by a suitable choice of cosolvent and/or by adjusting the pH of the solution.

EXAMPLE IV (COMPARATIVE)

Each of the compounds listed in the table below was dissolved in water to make a 20 percent by weight aqueous solution. The solutions were then tested for the absorption of microwave energy as described in Example I. The values for temperature at 300 Watts of microwave power input to the waveguide in the microwave apparatus were as follows for each of the solutions:

| Drying Component | pH | Conductivity (milliSiemens/cm) | Temperature Rise at 300 Watts (°F.) |
| --- | --- | --- | --- |
| bis(2-hydroxyethyl)amino-tris(hydroxymethyl)methane | 10.1 | 0.031 | 21 |
| tris(hydroxymethyl)amino-methane | — | 0.2 | 22 |
| Deionized water (control) | 7.1 | 0.0008 | 17 |

— = not measured

Both of these compounds are completely soluble in water, but each exhibited little or no ability to increase the microwave absorption of water solutions. From the chemical structures of these compounds, it can be seen that they are not expected to exist in a zwitterionic form and thus are not suitable drying components for the inks employed by the present invention.

EXAMPLE V

Each of the compounds listed in the table below was dissolved in water to make a 20 percent by weight aqueous solution. The solutions were then tested for the absorption of microwave energy as described in Example I. The values for temperature at 300 Watts of microwave power input to the waveguide in the microwave apparatus were as follows for each of the solutions:

| Drying Component | pH | Conductivity (milliSiemens/cm) | Temperature Rise at 300 Watts (°F.) |
| --- | --- | --- | --- |
| Glycine | 7.2 | 0.081 | 43 |
| 4-Aminobutyric acid | 6.8 | 0.534 | 49 |
| 6-Aminocaproic acid | 7.5 | 0.219 | 48 |
| aminomethanesulfonic acid | — | — | 48 |
| taurine | 4.6 | 0.021 | 45 |
| 3-aminopropylsulfonic acid | — | — | 47 |
| Deionized water (control) | 7.1 | 0.0008 | 17 |

— = not measured

As the data indicate, solutions containing the drying component exhibited significantly greater temperature rises upon exposure to microwave radiation than did the control.

EXAMPLE VI

Each of the compounds listed in the table below was dissolved in water to make a 20 percent by weight aqueous solution. The solutions were then tested for the absorption of microwave energy as described in Example I. The values for temperature at varying levels of microwave power input to the waveguide in the microwave apparatus were as follows for each of the solutions:

| Drying Component | pH | Conductivity (milliSiemens/cm) | Temperature Rise at 300 Watts (°F.) |
| --- | --- | --- | --- |
| Picolinic acid | 5.43 | 1.097 | 44 |
| Sarcosine | 6.32 | 0.161 | 46 |
| 2-Aminoethylhydrogensulfate | 2.64 | 2.11 | 46 |
| Deionized water (control) | 7.1 | 0.0008 | 17 |

As the data indicate, solutions containing the drying component exhibited significantly greater temperature rises upon exposure to microwave radiation than did the control.

EXAMPLE VII

An ink composition was prepared as follows. To 85.62 parts by weight deionized water were added 5 parts by weight diethylene glycol, 3 parts by weight Food Dye #2 (Mobay Bayscript Black, obtained from Mobay Corp., Pittsburgh, Pa.), 1.33 parts by weight Discole N509 (obtained from DKS International, Tokyo, Japan), 0.05 parts by weight polyethylene oxide (molecular weight 18,500, obtained from Polysciences, Inc., Warrington, Pa.), and 5 parts by weight 4-aminobutyric acid (obtained from Aldrich Chemical Co., Milwaukee, Wis.), followed by mixing of the ingredients to form an ink. Three more inks were also prepared of identical composition except that one contained 7.5 parts by weight of 2-aminoethylhydrogen sulfate (obtained from Aldrich Chemical Co., Milwaukee, Wis.), no 4-aminobutyric acid, and 83.12 parts by weight deionized water, another contained 7.75 parts by weight of glycylglycine (obtained from Aldrich Chemical Co., Milwaukee, Wis.), no 4-aminobutyric acid, and 82.87 parts by weight deionized water, and another contained 5 parts by weight of 4-aminocaproic acid and no 4-aminobutyric acid. For comparative purposes, an ink containing no drying component was also prepared; this ink was of identical composition to the first ink except that it contained no 4-aminobutyric acid and 90.62 parts by weight deionized water. These inks were then tested as follows. Images were then generated on Courtland 4200 plain paper (felt side) with each ink by printing a solid area pattern 0.64 inches by 4 inches with 1.8 milligrams per square centimeter of ink from a 300 spot per inch thermal ink jet printhead. 400 milliseconds after exiting the microwave applicator, a sheet of Nekoosa Ardor Bond paper (felt side) was placed in contact with the surface of the printed sheet and the two sheets were passed through a cold pressure nip formed by two rollers, with the roller length being 14.25 inches and the pressure being about 0.25 pounds as measured at each end of the rollers. The papers passed through the nip at a rate of 5 inches per second. The thermal ink jet printhead was situated 2 inches from the edge of the microwave power source wave guide (13 as shown in FIGS. 1A and 1B), the wave guide (13) extended for a length of 1.3 inches along the paper path, and the cold pressure nip (7 as shown in FIGS. 1A and 1C) was situated 3 inches from the exiting edge of the wave guide (13). Subsequently, the degree of image offset (amount of ink transferred from the imaged sheet to the second sheet) was measured in terms of the optical density of the ink transferred onto the second sheet. Specifically, the degree of offset was determined by measuring the optical density of the ink transferred onto the second sheet, and the optical density of the background, non-image-bearing areas of the paper was subtracted from this number. The optical density of an original image (prepared by the same printing process described above except that the printed image was not contacted with a second sheet of paper and passed through a pressure nip subsequent to microwave drying) was also measured, and the optical density of the background, non-image-bearing areas of the paper was subtracted from this number. The microwave power required for drying was defined as the power required to reach an offset density of 0.05 OD (optical density units) or less. Offset was expressed by the following equation:

$$\frac{D_s - D_{bkg}}{D_{orig} - D_{bkg}}$$

wherein $D_s$ represents the optical density of the ink transferred onto the second sheet, $D_{bkg}$ represents the optical density of the background, non-image-bearing areas of the paper, and $D_{orig}$ represents optical density of an original image. The values for offset at constant microwave power input to the waveguide in the microwave apparatus were as follows for the inks:

| Drying Agent | Percent Offset |
| --- | --- |
| 2-aminoethylhydrogen sulfate | 1 |
| glycylglycine | 0 |
| 4-aminobutyric acid | 0 |
| aminocaproic acid | 0 |
| none (control) | 7 |

As the data indicate, inks containing a drying component exhibited significantly reduced offset compared to the control ink containing no drying component.

Other embodiments and modifications of the present invention may occur to those skilled in the art subsequent to a review of the information presented herein; these embodiments and modifications, as well as equivalents thereof, are also included within the scope of this invention.

What is claimed is:

1. A thermal ink jet printing process which comprises (1) incorporating into a thermal ink jet printing apparatus an ink composition which comprises an aqueous liquid vehicle, a colorant, and a drying component selected from the group consisting of zwitterionic compounds; (2) heating the ink in an imagewise pattern to cause bubbles to form therein, thereby causing droplets of the ink to be ejected in an imagewise pattern onto a substrate, thereby generating images on the substrate; and (3) exposing the substrate to microwave radiation, thereby drying the images on the substrate, wherein the drying component is selected from the group consisting of amino acids.

2. A thermal ink jet printing process which comprises (1) incorporating into a thermal ink jet printing apparatus an ink composition which comprises an aqueous liquid vehicle, a colorant, and a drying component selected from the group consisting of zwitterionic compounds; (2) heating the ink in an imagewise pattern to cause bubbles to form therein, thereby causing droplets of the ink to be elected in an imagewise pattern onto a substrate, thereby generating images on the substrate; and (3) exposing the substrate to microwave radiation, thereby drying the images on the substrate, wherein the drying component is selected from the group consisting of betaine, betaine monohydrate, 1-(3-sulfopropyl)-pyridinium betaine, 1-(2-hydroxy-3-sulfopropyl)-pyridinium betaine, glycine, D,L-alanine, D,L-lysine, L-arginine, L-proline, trans-4-hydroxy-L-proline, N-(2-acetamido)-2-aminomethanesulfonic acid, N-(2-acetamido)aminodiacetic acid, N,N-bis(2-hydroxyethyl)-2-aminoethanesulfonic acid, N,N-bis(2-hydroxyethyl)-3-amino-2-hydroxypropanesulfonic acid, N,N-bis(2-hydroxyethyl)glycine, 2-(cyclohexylamino)ethanesulfonic acid, 3-(cyclohexylamino)-1-propanesulfonic acid, N-(1,1-dimethyl-2-hydroxyethyl)-3-amino-2-hydroxypropanesulfonic acid, glycyl-glycine, glycyl-glycyl-glycine, 4-(2-hydroxyethyl)piperazine-1-ethanesulfonic acid, 4-(2-hydroxyethyl)piperazine-1-(2-hydroxypropanesulfonic acid), 4-(2-hydroxyethyl)piperazine-1-propanesulfonic acid, 2-morpholinoethanesulfonic acid monohydrate, 3-morpholino-2-hydroxypropanesulfonic acid, 3-morpholinopropanesulfonic acid, piperazine-1,4-bis(2-ethanesulfonic acid), piperazine-1,4-bis(2-hydroxypropanesulfonic acid, taurine, N-tris(hydroxy-methyl)methyl-2-aminoethanesulfonic acid, N-[tris(hydroxymethyl)methyl]-3-amino-2-hydroxypropanesulfonic acid, N-[tris(hydroxymethyl)methyl]-3-aminopropanesulfonic acid, N-[tris(hydroxymethyl)methyl]glycine, β-alanine, 4-aminobutyric acid, 6-aminocaproic acid, aminomethanesulfonic acid, picolinic acid, sarcosine, 2-aminoethylhydrogen sulfate, and mixtures thereof.

3. A printing process according to claim 2 wherein the colorant is a dye.

4. A printing process according to claim 2 wherein the colorant is a pigment.

5. A printing process according to claim 2 wherein the drying component is present in the ink in an amount of from about 5 to about 50 percent by weight.

6. A printing process according to claim 2 wherein the drying component is present in the ink in an amount of from about 5 to about 30 percent by weight.

7. A printing process according to claim 2 wherein the drying component is soluble in the ink in a concentration of at least about 2 percent by weight.

* * * * *